US012618669B2

(12) United States Patent
Yamaguchi

(10) Patent No.: US 12,618,669 B2
(45) Date of Patent: May 5, 2026

(54) TIRE SENSOR AND TIRE

(71) Applicant: BRIDGESTONE CORPORATION, Tokyo (JP)

(72) Inventor: Shigeru Yamaguchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 277 days.

(21) Appl. No.: 18/681,513

(22) PCT Filed: Jun. 7, 2022

(86) PCT No.: PCT/JP2022/023009
§ 371 (c)(1),
(2) Date: Feb. 6, 2024

(87) PCT Pub. No.: WO2023/032392
PCT Pub. Date: Mar. 9, 2023

(65) Prior Publication Data
US 2025/0052570 A1 Feb. 13, 2025

(30) Foreign Application Priority Data
Sep. 1, 2021 (JP) ................................. 2021-142712

(51) Int. Cl.
*G01B 21/32* (2006.01)
*B60C 25/00* (2006.01)
(Continued)

(52) U.S. Cl.
CPC ............ *G01B 21/32* (2013.01); *B60C 25/005* (2013.01); *B60C 23/0486* (2013.01);
(Continued)

(58) Field of Classification Search
CPC .. G01B 21/32; G01B 2210/58; B60C 25/005; B60C 23/0486; B60C 23/0493; B60C 23/20; B60C 23/064
See application file for complete search history.

(56) References Cited

U.S. PATENT DOCUMENTS 6,030,478 A * 2/2000 Koch ...................... B60C 23/04
156/123
6,255,940 B1 * 7/2001 Phelan ................ B60C 23/0493
73/146
(Continued)

FOREIGN PATENT DOCUMENTS

JP 2006507495 A 3/2006
JP 2009198505 A 9/2009
(Continued)

OTHER PUBLICATIONS

Mar. 5, 2024, International Preliminary Report on Patentability issued in the International Patent Application No. PCT/JP2022/023009.
(Continued)

*Primary Examiner* — Freddie Kirkland, III
(74) *Attorney, Agent, or Firm* — KENJA IP LAW PC

(57) ABSTRACT
A tire sensor according to the present disclosure is a tire sensor configured to be mountable on a tire inner surface. The tire sensor includes a sensor body including electronic circuitry including a detector configured to be able to detect tire information, and a cover body configured to cover at least a part of a periphery of the sensor body. The cover body includes a mounting surface configured to be mountable on the tire inner surface, and a side surface configured to rise from an outer edge of the mounting surface. In the side surface of the cover body, a concave portion is formed between the mounting surface and a height position of ¼ of
(Continued)

a maximum sensor height in a sensor height direction orthogonal to the mounting surface.

9 Claims, 7 Drawing Sheets

(51) Int. Cl.
  *B60C 23/04*    (2006.01)
  *B60C 23/20*    (2006.01)

(52) U.S. Cl.
  CPC .......... *B60C 23/0493* (2013.01); *B60C 23/20* (2013.01); *G01B 2210/58* (2013.01)

(56)     References Cited

U.S. PATENT DOCUMENTS

| | | | | |
|---|---|---|---|---|
| 6,386,251 | B1 * | 5/2002 | Koch ................. | B60C 23/0433 |
| | | | | 73/146.5 |
| 6,462,650 | B1 * | 10/2002 | Balzer ................ | B60C 23/0493 |
| | | | | 73/146 |
| 7,009,506 | B2 | 3/2006 | Wilson et al. | |
| 7,331,367 | B2 * | 2/2008 | Koch ................. | B60C 23/0493 |
| | | | | 340/442 |
| 7,770,444 | B2 * | 8/2010 | Bertrand ............ | B60C 23/0493 |
| | | | | 73/146.5 |
| 9,566,835 | B2 | 2/2017 | Yamaguchi | |
| 11,203,236 | B2 | 12/2021 | Kim et al. | |
| 12,179,521 | B2 * | 12/2024 | Canu ................... | H01Q 1/2241 |
| 12,344,051 | B2 * | 7/2025 | Ferry ...................... | G01K 1/14 |

| | | | | |
|---|---|---|---|---|
| 2002/0046791 | A1 * | 4/2002 | Rensel ................ | B60C 23/0493 |
| | | | | 152/151 |
| 2002/0124934 | A1 * | 9/2002 | Koch .................. | B60C 23/0493 |
| | | | | 156/64 |
| 2002/0174925 | A1 * | 11/2002 | Wilson .................... | B60C 23/04 |
| | | | | 152/415 |
| 2005/0076992 | A1 * | 4/2005 | Metcalf ................ | H01Q 1/2241 |
| | | | | 156/303.1 |
| 2005/0126668 | A1 * | 6/2005 | Fornerod ............ | B60C 23/0493 |
| | | | | 152/367 |
| 2006/0158340 | A1 * | 7/2006 | Wilson ................ | B60C 23/0493 |
| | | | | 340/693.12 |
| 2006/0237109 | A1 | 10/2006 | Mangold et al. | |
| 2021/0370727 | A1 | 12/2021 | Yamaguchi | |
| 2021/0394566 | A1 | 12/2021 | Yamaguchi | |

FOREIGN PATENT DOCUMENTS

| | | | |
|---|---|---|---|
| JP | 2013226853 | A | 11/2013 |
| JP | 2018001627 | A | 1/2018 |
| JP | 2020026268 | A | 2/2020 |
| JP | 2020055402 | A | 4/2020 |
| JP | 2020093751 | A | 6/2020 |

OTHER PUBLICATIONS

Jul. 12, 2022, International Search Report issued in the International Patent Application No. PCT/JP2022/023009.
Dec. 11, 2024, search result of the Extended European Search Report issued by the European Patent Office in the corresponding European Patent Application No. 22863980.3.

* cited by examiner

TIRE SENSOR AND TIRE

TECHNICAL FIELD

The present disclosure relates to a tire sensor and a tire.

BACKGROUND

Technology for mounting tire sensors on inner surfaces of tires for the purpose of detecting temperature and pressure inside the tires is known. Patent Literature (PTL) 1 discloses this type of tire sensor.

CITATION LIST

Patent Literature

PTL 1: JP 2013-226853 A

SUMMARY

Technical Problem

Tires are repeatedly deformed by contact with road surfaces during driving. Therefore, tire sensors mounted on inner surfaces of the tires are required to have durability (hereinafter referred to as "tire sensor durability") so that the tire sensors are not detached even with the above-described repeated deformation of the tires. In the tire sensor described in PTL 1, the tire sensor durability is enhanced by a groove provided in a rubber base. However, even in the tire sensor described in PTL 1, there is still room for improvement with respect to the tire sensor durability.

It would be helpful to provide a tire sensor with improved durability, and a tire.

Solution to Problem

A tire sensor as a first aspect of the present disclosure is a tire sensor configured to be mountable on a tire inner surface. The tire sensor includes a sensor body including electronic circuitry including a detector configured to be able to detect tire information, and a cover body configured to cover at least a part of a periphery of the sensor body. The cover body includes a mounting surface configured to be mountable on the tire inner surface, and a side surface configured to rise from an outer edge of the mounting surface. In the side surface of the cover body, a concave portion is formed between the mounting surface and a height position of ¼ of a maximum sensor height in a sensor height direction orthogonal to the mounting surface.

A tire as a second aspect of the present disclosure includes the tire sensor described above.

Advantageous Effect

According to the present disclosure, it is possible to provide a tire sensor with improved durability, and a tire.

BRIEF DESCRIPTION OF THE DRAWINGS

In the accompanying drawings:

FIG. 3 is a cross-sectional view of the tire sensor in a cross-section along a sensor height direction;

FIG. 6 is a diagram illustrating details on a detection body of a strain detector illustrated in FIG. 4.

DETAILED DESCRIPTION

Embodiments of a tire sensor and a tire according to the present disclosure will be exemplarily described below with reference to the drawings. In each of the drawings, the same configurations are denoted with the same reference signs.

Figure 1:
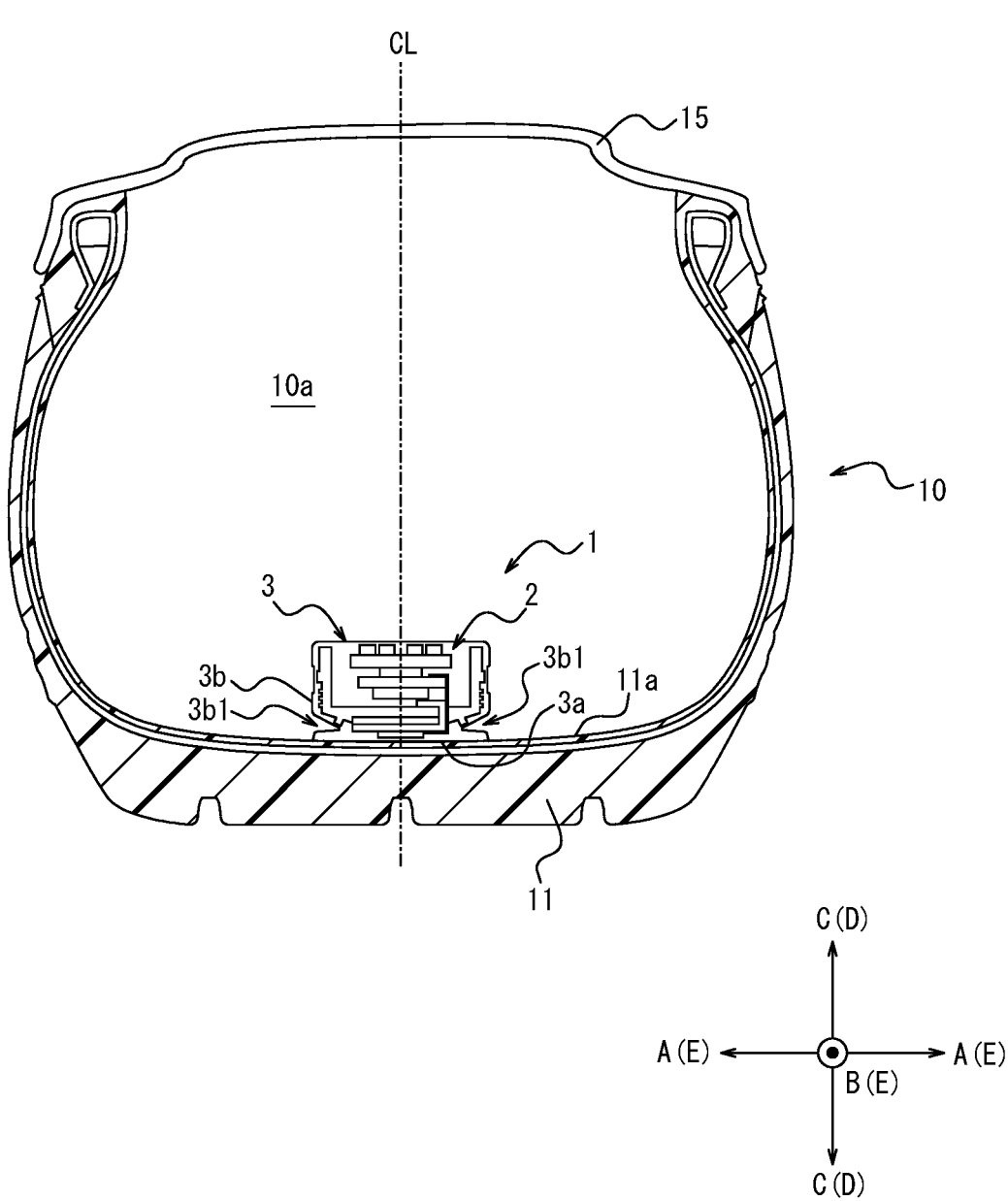
FIG. 1 is a tire-width-directional cross-sectional view of a tire, as an embodiment of the present disclosure, that includes a tire sensor as an embodiment of the present disclosure.
Figure 2:
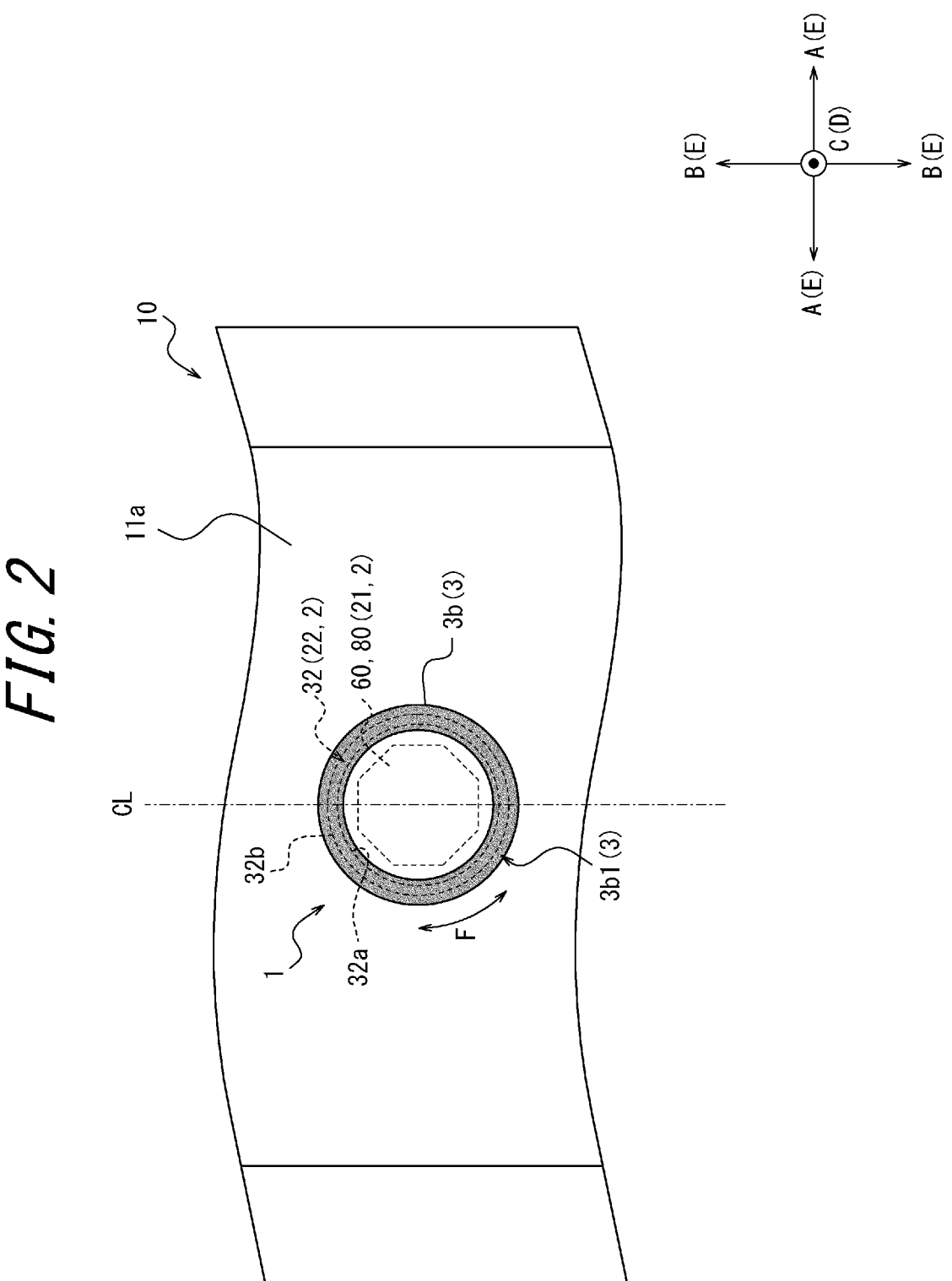
FIG. 2 is a diagram in which the tire sensor illustrated in FIG. 1 is viewed from the side of an inner space of the tire.

FIG. 1 is a tire-width-directional cross-sectional view of a pneumatic tire 10 (hereinafter referred to as "tire 10"), as an embodiment of the tire according to the present disclosure. FIG. 1 illustrates a state of the tire 10 assembled on a rim 15. An inner space 10*a* of the tire 10 is filled with a gas such as air. As illustrated in FIG. 1, the tire 10 includes a tire sensor 1, as an embodiment of the tire sensor according to the present disclosure. FIG. 2 is a diagram in which the tire sensor 1 illustrated in FIG. 1 is seen from the side of the inner space 10*a* of the tire 10. Here, "tire-width-directional cross-section" means a cross-section parallel to a tire width direction A at a position including a central axial line of the tire 10. FIG. 1 is a tire-width-directional cross-sectional view of the tire 10 that passes through a position at which the tire sensor 1 is located in a tire circumferential direction B.

In this specification, "rim" means a standard rim (Measuring Rim in ETRTO's STANDARDS MANUAL and Design Rim in TRA's YEAR BOOK) of an applicable size conformable to industrial standards valid for regions in which tires are produced and used, as described in or to be described in JATMA YEAR BOOK of the JATMA (The Japan Automobile Tyre Manufacturers Association, Inc.) in Japan, STANDARDS MANUAL of the ETRTO (The European Tyre and Rim Technical Organisation) in Europe, YEAR BOOK of TRA (The Tire and Rim Association, Inc.) in the United States, or the like, but in the case of a size that is not listed in such industrial standards, a rim with a width corresponding to a bead width of the tire. "Rim" may be of a size that may be included in the above industrial standards in the future, as well as a current size. Examples of the "size that is included in the future" may be sizes listed as "FUTURE DEVELOPMENTS" in the 2013 edition of STANDARDS MANUAL of the ETRTO.

As illustrated in FIGS. 1 and 2, the tire sensor 1 is secured on a tire inner surface with an adhesive. The tire sensor 1 of this embodiment is mounted on a tire inner circumferential surface 11*a*, as the tire inner surface, which is a back side of a tread 11 of the tire 10 that contacts a road surface 200 (see FIG. 5). The tire sensor 1 is mounted on a middle of the tire inner circumferential surface 11*a* in the tire width direction A. More specifically, the tire sensor 1 is mounted on the tire inner circumferential surface 11*a* at a position that intersects a tire equatorial plane CL.

In this specification, "tread inner circumferential surface" means an inner surface located on a back side of a tire outer circumferential surface over the entire circumference of the tire, which is in contact with the road surface when the tire that is assembled on the rim and filled with a specified internal pressure is rotated under a condition with a maximum load (hereinafter also referred to as "maximum load condition").

In this specification, the above "specified internal pressure" refers to an air pressure (maximum air pressure) corresponding to a maximum load capacity of a single wheel in an applicable size and ply rating described in the above JATMA YEAR BOOK and other industrial standards, and in the case of a size not described in the above industrial standards, an air pressure (maximum air pressure) corresponding to a maximum load capacity specified for each vehicle on which the tire is mounted. In this specification, "maximum load" means a load corresponding to a maximum load capacity in the tire of an applicable size listed in the above industrial standards, and in the case of a size not listed in the above industrial standards, a load corresponding to a maximum load capacity specified for each vehicle on which the tire is mounted.

The type of tire 10 on which the tire sensor 1 is mounted is not particularly limited. Examples of the tire 10 include, for example, tires of passenger cars, trucks, buses, other automobiles, aircraft, and other vehicles that primarily travel on normal paved roads (general roads and highways).

The type of tire sensor 1 is not particularly limited. The tire sensor 1 may be, for example, a strain sensor that can detect a strain of the tire 10 as tire information. The tire sensor 1 may be, for example, a temperature sensor that can detect, as the tire information, the temperature of the inner space 10*a* of the tire 10. Furthermore, the tire sensor 1 may be, for example, a pressure sensor that can detect, as the tire information, the pressure of the inner space 10*a* of the tire 10. The tire sensor 1 may be, for example, a combined sensor that can detect two or more of the strain of the tire 10, the temperature of the inner space 10*a* of the tire 10, and the pressure of the inner space 10*a* of the tire 10. The tire sensor 1 may also be configured to be able to detect tire information such as an acceleration, for example, other than the tire information described above.

The tire sensor 1 is configured to be able to transmit the detected tire information to an external device, such as, for example, an in-vehicle device installed in a vehicle. Various signals of the tire information transmitted wirelessly from the tire sensor 1 may be received, for example, by radio circuitry of the in-vehicle device. The received tire information, information indicating the condition of the tire obtained based on this tire information, or the like may be displayed on a display unit provided in the vehicle. However, applications, display methods, and the like of the tire information detected by the tire sensor 1 are not particularly limited.

Figure 3:
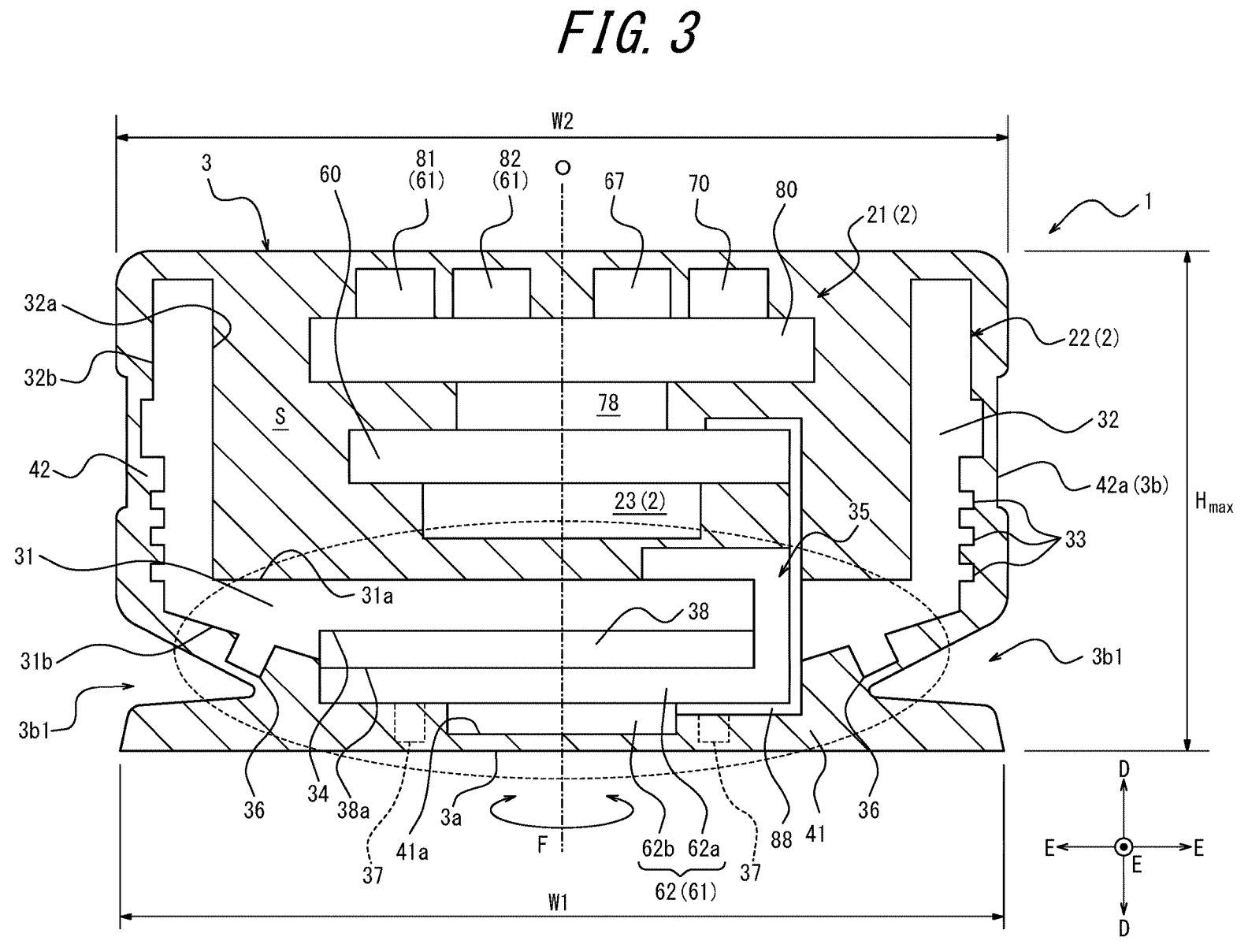
Figure 4:
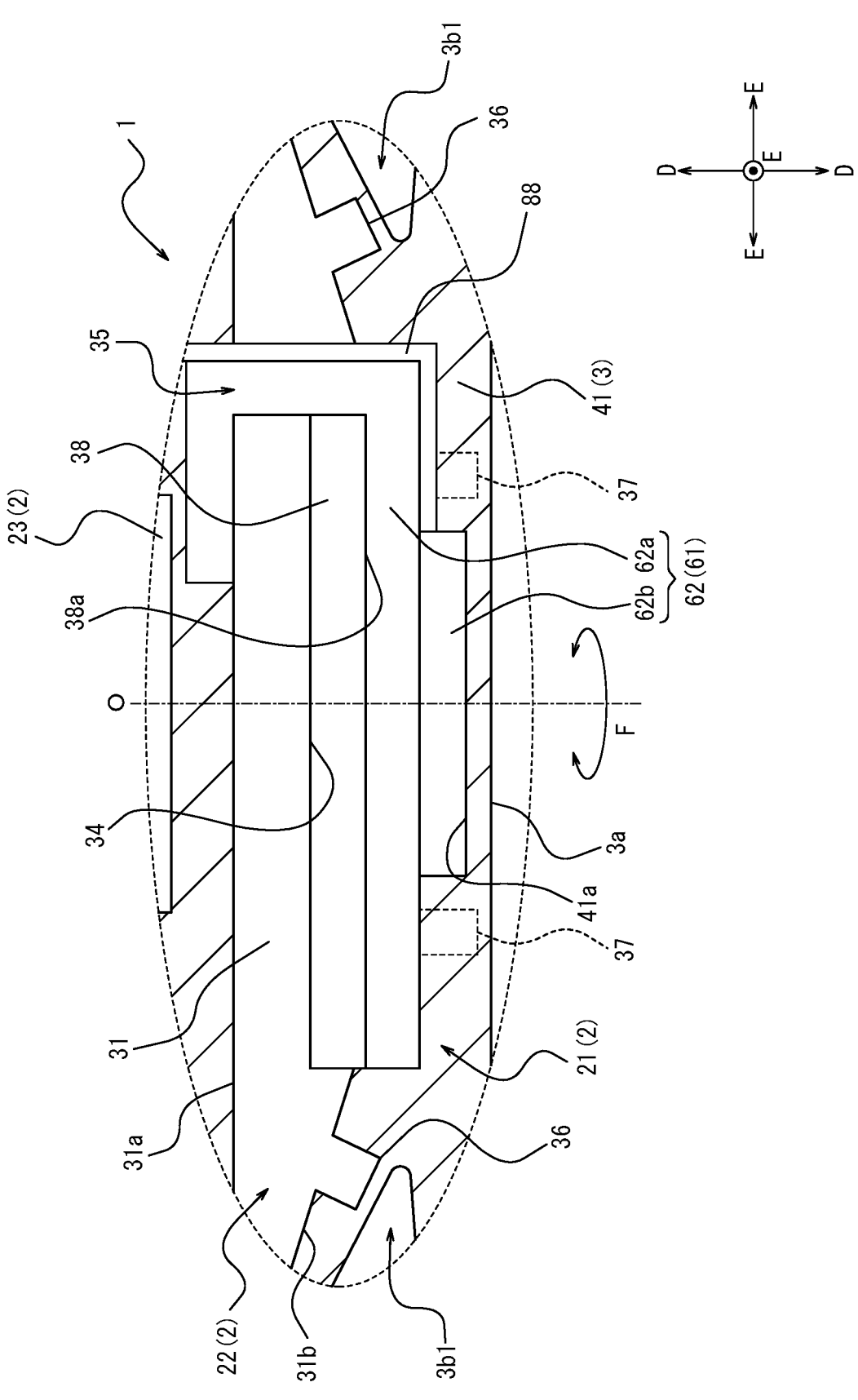
FIG. 4 is an enlarged cross-sectional view of a part of FIG. 3.

FIG. 3 is a cross-sectional view of the tire sensor 1. FIG. 4 is an enlarged cross-sectional view of a part of FIG. 3. As illustrated in FIGS. 3 and 4, the tire sensor 1 includes a sensor body 2 and a cover body 3.

The sensor body 2 includes electronic circuitry including a detector 61 that can detect the tire information. More specifically, the sensor body 2 according to this embodiment includes a circuit member 21, a housing 22, and a power source 23.

The circuit member 21 constitutes the electronic circuitry including the detector 61. The circuit member 21 may be, for example, a sensor module. That is, the circuit member 21 includes a plurality of electronic components that constitute the electronic circuitry including the detector 61. As will be described in detail below, the circuit member 21 according to this embodiment includes circuit boards 60 and 80 as the electronic components.

The housing 22 supports the circuit member 21. The housing 22 is composed of an insulator. The housing 22 is preferably composed of a resin material. The resin material composing the housing 22 is, for example, a nylon-based resin material such as polyphthalamide.

The power source 23 provides electric power to the electronic circuitry constituted of the circuit member 21. The power source 23 is, for example, a battery.

The cover body 3 covers at least a part of a periphery of the sensor body 2. The cover body 3 includes a mounting surface 3*a* that can be mounted on the tire inner surface, and a side surface 3*b* that rises from an outer edge of the mounting surface 3*a*.

Figure 5:
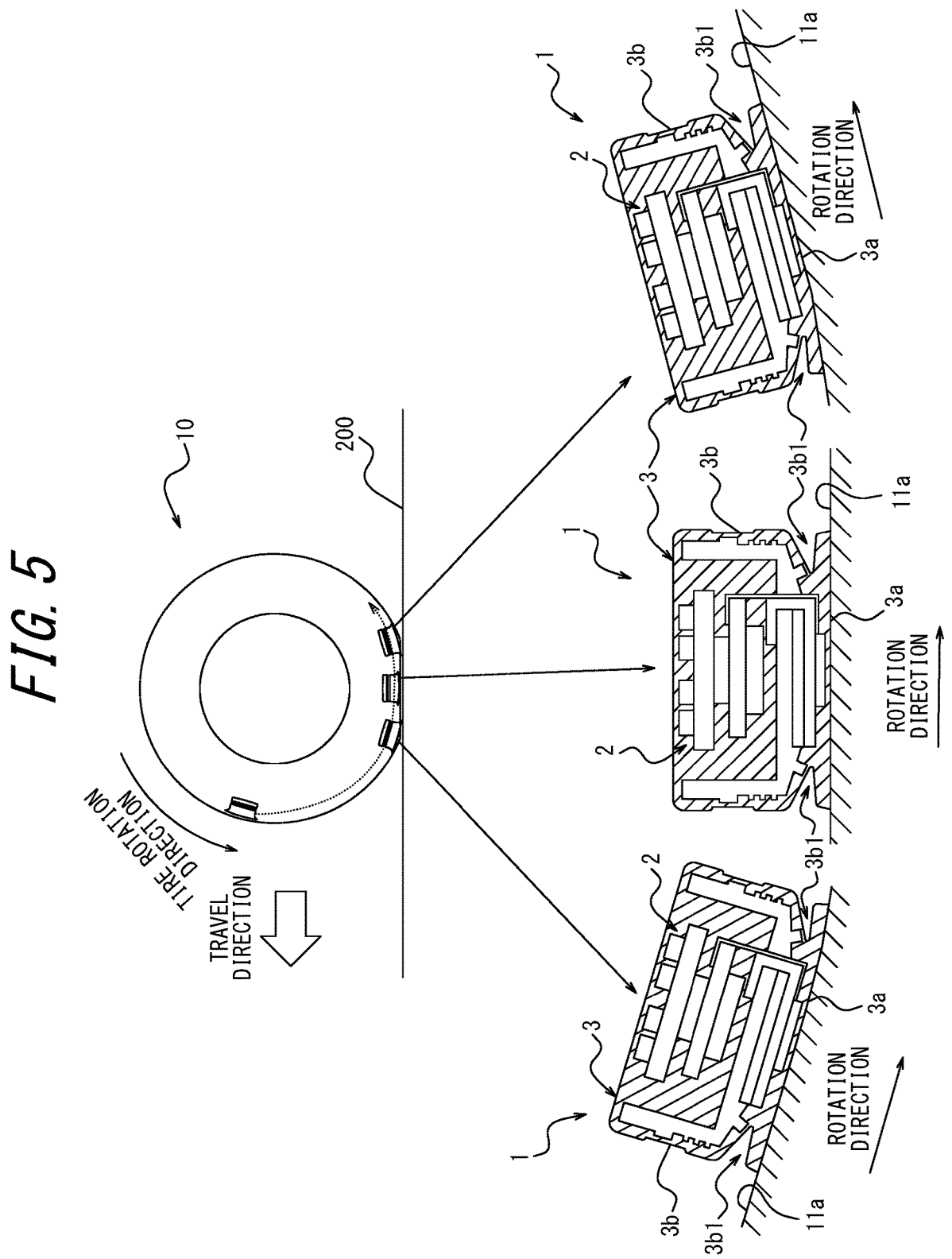
FIG. 5 is a diagram illustrating deformation of the tire sensor illustrated in FIG. 1 associated with deformation of the tire illustrated in FIG. 1.

As illustrated in FIGS. 1 and 3, a concave portion 3*b*1 is formed in the side surface 3*b* of the cover body 3. FIG. 5 is a diagram illustrating deformation of the tire sensor 1 associated with deformation of the tire 10. As illustrated in FIG. 5, the concave portion 3*b*1 that is formed in the side surface 3*b* of the cover body 3 can absorb stress that acts on the tire sensor 1 due to repeated tire deformation caused by contact with the road surface 200 during driving. Therefore, it is possible to prevent the entire tire sensor 1 from detaching from the tire inner surface by peeling off the mounting surface 3*a* from the tire inner surface due to the above tire deformation, and a part of the tire sensor 1 from floating and detaching from the tire inner surface due to damage to the cover body 3. That is, the provision of the concave portion 3*b*1 in the side surface 3*b* of the cover body 3 allows to realize the tire sensor 1 that is hard to detach from the tire inner surface even with the repeated tire deformation during driving.

The concave portion 3*b*1 is formed between the mounting surface 3*a* and a height position of ¼ of a maximum sensor height Hmax in a sensor height direction D orthogonal to the mounting surface 3*a*. In other words, the concave portion 3*b*1 is formed close to the mounting surface 3*a* in the sensor height direction D. Therefore, a force (hereinafter referred to as "detachment force") that acts in the vicinity of the mounting surface 3*a* due to the tire deformation to detach the tire sensor 1 from the tire inner surface is easily absorbed by the concave portion 3*b*1. This can further prevent the detachment of the tire sensor 1 from the tire inner surface. The concave portion 3*b*1 is more preferably formed between the mounting surface 3*a* and a height position of ⅕ of the maximum sensor height Hmax in the sensor height direction D orthogonal to the mounting surface 3*a*. Note that, the sensor height direction D in this embodiment is the same direction as a tire radial direction C when the tire sensor 1 is mounted on the tire inner circumferential surface 11*a* as in this embodiment.

Thus, the provision of the concave portion 3*b*1 in the side surface 3*b* of the cover body 3 at the height position described above can increase the durability of the tire sensor 1.

Figure 6:
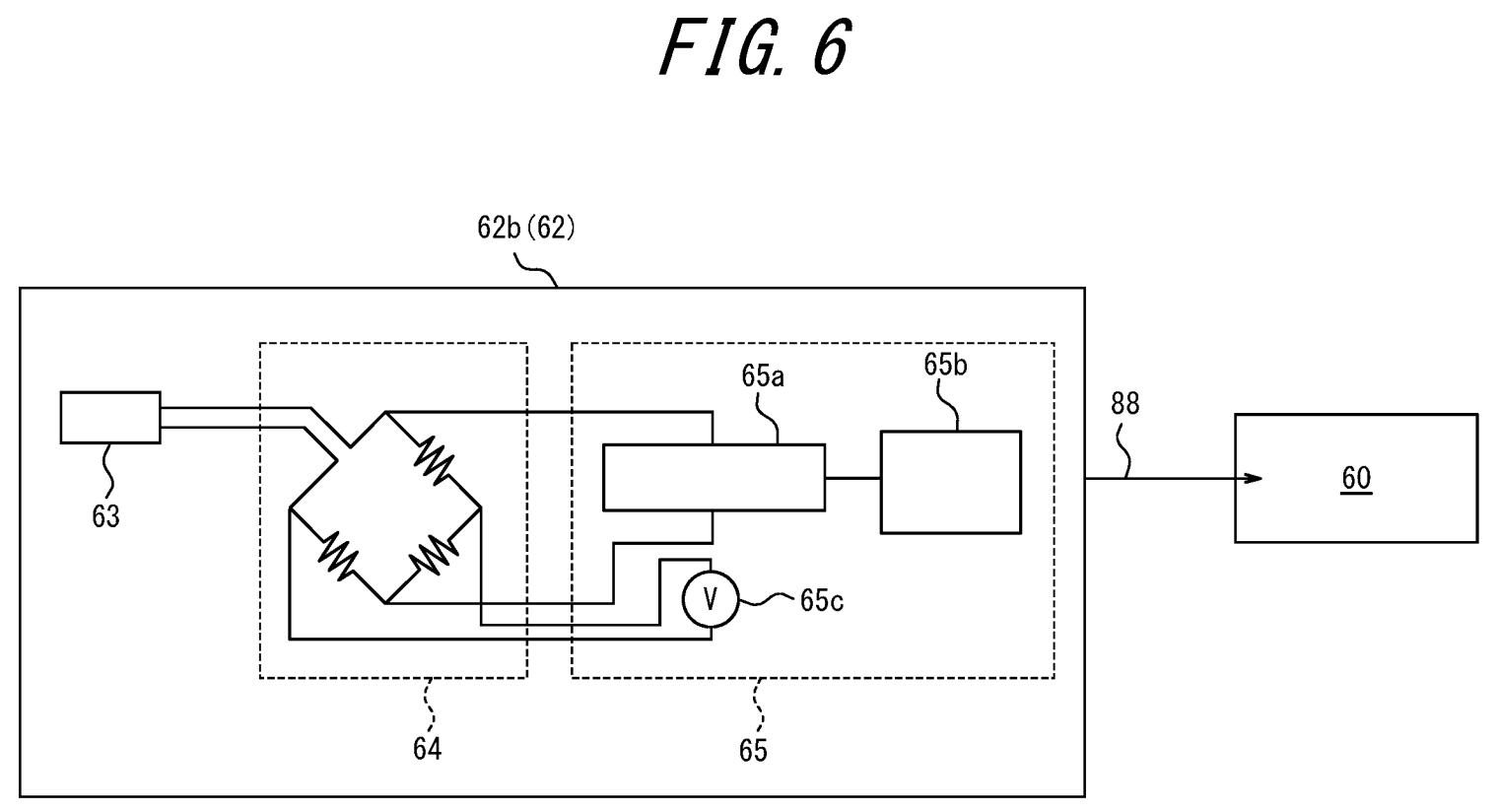
Figure 7:
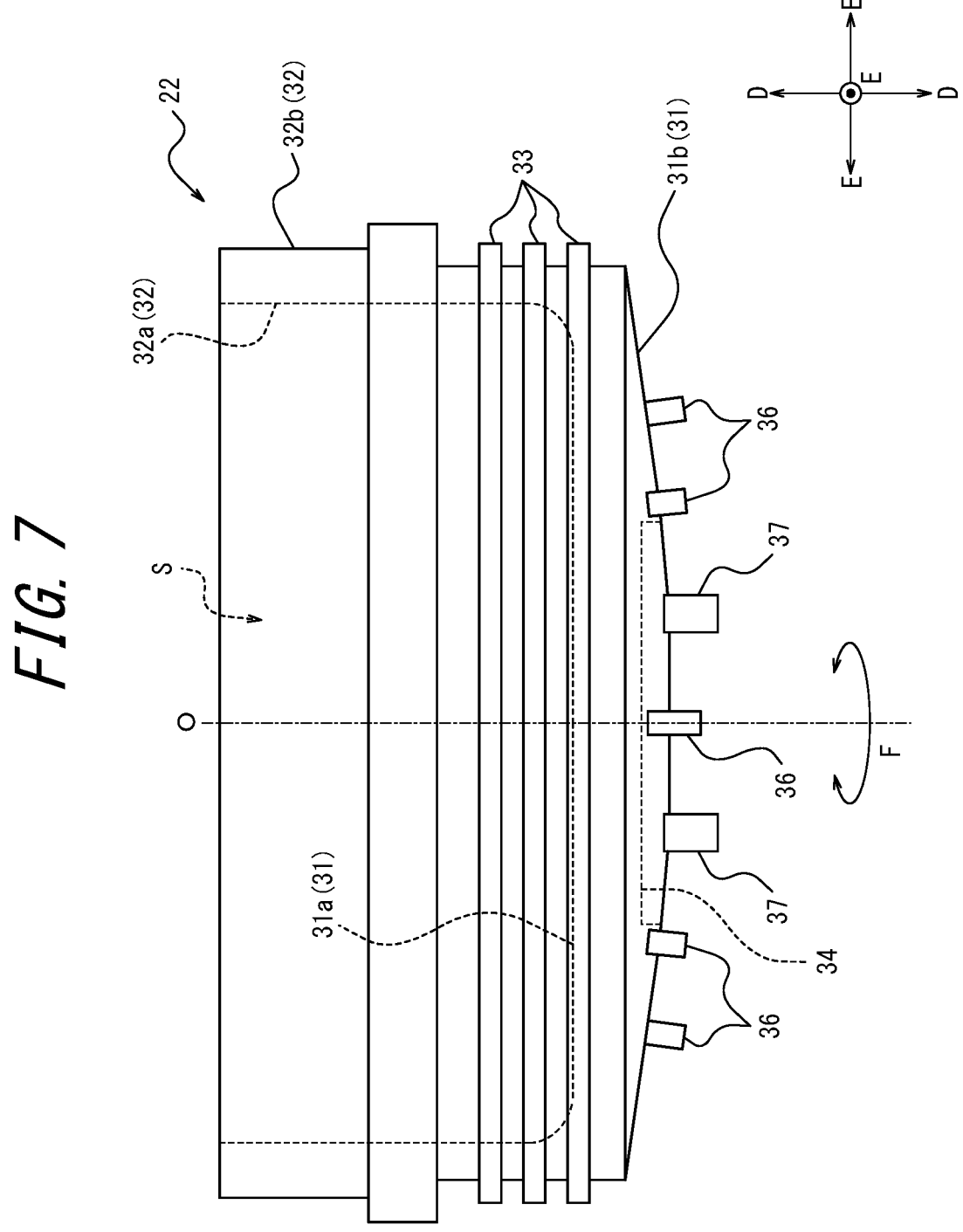
FIG. 7 is a side view of a housing, by itself, illustrated in FIG. 3.

Further details on the tire sensor 1 of this embodiment will be described below with reference to FIGS. 1 to 7. FIG. 6 is a diagram illustrating details on a detection body 62*b* of a strain detector 62 of the sensor body 2. FIG. 7 is a side view of the housing 22, by itself, of the sensor body 2.

<Housing 22 of Sensor Body 2>

As illustrated in FIG. 7 and the like, the housing 22 of this embodiment includes a circular bottom portion 31 and a cylindrical tubular portion 32 rising from an outer edge of the bottom portion 31. In other words, the housing 22 of this embodiment is composed in a bottomed cylindrical shape with an opening on only one side. The bottom portion 31 and the tubular portion 32 of this embodiment partition an accommodation space S that accommodates at least a part of the circuit member 21. In this embodiment, an inner circumferential surface 32a of the tubular portion 32 that partitions the accommodation space S is a cylindrical surface with a constant diameter. In this embodiment, an inner bottom surface 31a of the bottom portion 31 is a plane orthogonal to a central axis O of the inner circumferential surface 32a of the tubular portion 32. The inner bottom surface 31a of the bottom portion 31 and the inner circumferential surface 32a of the tubular portion 32 may be provided with latch portions, such as projections, to support the circuit member 21 when the circuit member 21 is accommodated in the accommodation space S. The housing 22 is composed of synthetic resin, for example, from the viewpoint of reduced weight and increased strength of the tire sensor 1. The material composing the housing 22 can be changed as appropriate from the viewpoint of reduction in the weight and increase in the strength of the tire sensor 1. However, the housing 22 of this embodiment is configured with higher stiffness than at least the cover body 3.

The housing 22 of this embodiment is disposed so that an axial direction parallel to the central axis O of the tubular portion 32 coincides with the sensor height direction D of the tire sensor 1. Therefore, in this embodiment, a sensor width direction E, which is orthogonal to the sensor height direction D, of the tire sensor 1 coincides with a radial direction of the tubular portion 32. In this embodiment, in a plan view of the tire sensor 1 along the sensor height direction D (see FIG. 2), a sensor circumferential direction F along an outer edge of the tire sensor 1 coincides with a circumferential direction of the tubular portion 32.

A plurality of annular convex portions 33 in which concavities and convexities are arranged in a row along the axial direction of the tubular portion 32 is formed in an outer circumferential surface 32b of the tubular portion 32. The annular convex portions 33 are provided in the tubular portion 32 on the side of the bottom portion 31, and are formed in plurality (three in this embodiment) at predetermined intervals in the axial direction. Each of the annular convex portions 33 is connected in an unterminated manner over the entire circumferential direction of the tubular portion 32. However, the annular convex portions 33 may be provided in an intermittent manner in the circumferential direction of the tubular portion 32.

As illustrated in FIGS. 3 and 7, an outer bottom surface 31b of the bottom portion 31 is composed of a convex surface that expands outward in the axial direction of the tubular portion 32 at a center side of the outer bottom surface 31b relative to an outer edge side thereof. More specifically, the outer bottom surface 31b of this embodiment is composed of a spherical curved surface. However, the shape of the outer bottom surface 31b is not particularly limited. The outer bottom surface 31b may be, for example, a conical surface, a truncated conical surface, or some other curved surface. The outer bottom surface 31b may be, for example, a flat surface orthogonal to the axial direction. As illustrated in FIG. 1, the outer bottom surface 31b of the bottom portion 31 is a surface facing the tire inner circumferential surface 11a of the tire 10 when the tire sensor 1 is mounted on the tire inner circumferential surface 11a of the tire 10.

The outer bottom surface 31b of the bottom portion 31 includes a mounting portion 34 on which the strain detector 62, as the detector 61 of the circuit member 21, is mounted. In the bottom portion 31, a through hole 35 that penetrates from the outer bottom surface 31b to the inner bottom surface 31a is formed. Further, the bottom portion 31 includes a plurality of convex portions 36 and a plurality of support portions 37 that protrude from the outer bottom surface 31b.

The mounting portion 34 is composed of a concave portion provided in the outer bottom surface 31b at a position through which the central axis O of the tubular portion 32 passes. A bottom surface of the concave portion, as the mounting portion 34, is, for example, a plane orthogonal to the axial direction of the tubular portion 32. As illustrated in FIG. 4, a base member 38, which serves as a foundation for mounting the strain detector 62 as the detector 61, is disposed on the mounting portion 34.

The base member 38 is composed of, for example, a flat plate member that conforms to the shape of the mounting portion 34 of the outer bottom surface 31b and is partially embedded. The base member 38 is, for example, secured to the mounting portion 34 with an adhesive or the like. When the base member 38 is secured to the mounting portion 34, a detector mounting surface 38a of the base member 38, on which the strain detector 62 is mounted, is exposed outside the concave portion, as the mounting portion 34. Therefore, when the strain detector 62 is mounted on the detector mounting surface 38a of the base member 38, the strain detector 62 is exposed so as to protrude from the outer bottom surface 31b. A strain of the tire 10 caused by rotation of the tire 10 can be thereby detected with high accuracy. The base member 38 is composed of an elastomer such as rubber. In this embodiment, a silicon rubber with a Shore A hardness of about 50 is used, but the thickness, hardness, material, and the like of the base member 38 may be changed as appropriate to enable detection of the strain with high accuracy.

As illustrated in FIG. 4, the through hole 35 is disposed so as to be connected to the mounting portion 34. The through hole 35 extends along the axial direction of the tubular portion 32 from the inner bottom surface 31a to the outer bottom surface 31b of the housing 22. Into the through hole 35, wiring 88 that connects the strain detector 62 to other electronic components constituting the electronic circuitry is inserted.

As illustrated in FIG. 7, the convex portions 36 and the support portions 37 are disposed on the outer bottom surface 31b of the bottom portion 31 at different positions from the positions of the mounting portion 34 and the through hole 35 described above. The positions at which the convex portions 36 are disposed are not particularly limited.

The convex portions 36 of this embodiment are cylindrical, but are not limited to this shape. The convex portions 36 may be, for example, polygonal columnar, conical, truncated conical, or the like. In the outer bottom surface 31b, for example, a plurality of concave portions may be formed, instead of or in addition to the convex portions 36. The provision of such convex portions 36 or concave portions can increase securing strength to the cover body 3.

The extension length of each support portion 37 is set so that a tip of the support portion 37 protrudes from a surface of the strain detector 62 when the strain detector 62 is mounted on the housing 22. This prevents a gap between the strain detector 62 and the tire inner surface from becoming excessively narrow due to, for example, a centrifugal force of the tire 10, or the like.

<Circuit Member 21 of Sensor Body 2>

As illustrated in FIG. 3, the circuit member 21 of this embodiment includes the two circuit boards 60 and 80 on or to which the electronic components are mounted or connected. The circuit boards 60 and 80 are accommodated in the accommodation space S partitioned by the above housing 22. As illustrated in FIG. 3, the circuit boards 60 and 80, together with the strain detector 62 as the detector 61, constitute the electronic circuitry.

In addition to the strain detector 62, the circuit member 21 of this embodiment includes a plurality of detectors 61. Specifically, the circuit member 21 of this embodiment includes a temperature detector 81 that detects the temperature of the inner space 10a of the tire 10. Furthermore, the circuit member 21 of this embodiment includes a pressure detector 82 that detects the pressure of the inner space 10a of the tire 10. Therefore, the circuit boards 60 and 80 of this embodiment constitute the electronic circuitry, together with the strain detector 62, the temperature detector 81, and the pressure detector 82. Each of the strain detector 62, temperature detector 81, and pressure detector 82 may be constituted of various electronic components mounted on or connected to the circuit board 60 or 80. The circuit member 21 may be configured with only a part of the above various detectors 61. The circuit member 21 may include some other detector 61, such as an acceleration detector, in addition to or instead of the above various detectors 61.

The two circuit boards 60 and 80 are arranged so as to face each other in the sensor height direction D. The circuit board 80 is located farther from the mounting surface 3a than the circuit board 60 in the sensor height direction D. For convenience of explanation, the circuit board 60 located closer to the mounting surface 3a is referred to as "first circuit board 60", and the circuit board 80 located farther from the mounting surface 3a is referred to as "second circuit board 80". The first circuit board 60 and the second circuit board 80 of this embodiment are electrically connected by a connection portion 78, such as coupling pins, for example, and constitute the integral electronic circuitry.

In this embodiment, the temperature detector 81 and the pressure detector 82 are mounted on the second circuit board 80. A controller 70 and a communication interface 67, which are described later, are also mounted on the second circuit board 80. Since the communication interface 67 is mounted on the second circuit board 80, radio waves transmitted from the communication interface 67 are less likely to be blocked, compared to a configuration in which the communication interface 67 is mounted on the first circuit board 60, which is disposed between the second circuit board 80 and the tire inner surface. This can enhance the communicability of the tire sensor 1.

In this embodiment, the strain detector 62 is connected to the first circuit board 60 via the wiring 88. As in this embodiment, the strain detector 62 is preferably connected to the first circuit board 60, which is disposed closer to the tire inner surface than the second circuit board 80, when the tire sensor 1 is mounted on the tire inner surface (see FIG. 1). This can shorten the distance of the wiring 88 and thus simplify the circuit configuration.

As described above, in this embodiment, the temperature detector 81 and the pressure detector 82 are mounted on the second circuit board 80, but may be connected to the second circuit board 80 via wiring. Furthermore, the temperature detector 81 and the pressure detector 82 may be mounted on or connected to the first circuit board 60. That is, when a detector 61 that is mounted on or connected to the first circuit board 60 is referred to as "first detector" and a detector 61 that is mounted on or connected to the second circuit board 80 is referred to as "second detector", the temperature detector 81 and the pressure detector 82 may be first detectors or second detectors.

The circuit member 21 of this embodiment includes the controller 70 that processes the tire information detected by the above various detectors 61. The controller 70 of this embodiment controls operations of the temperature detector 81, the pressure detector 82, and the strain detector 62. Furthermore, the controller 70 of this embodiment controls operations of the communication interface 67. The controller 70 of this embodiment is mounted on the second circuit board 80 as described above, but may be mounted on the first circuit board 60.

The controller 70 is configured, for example, as a one-chip IC that functions as a so-called computer, or the like. Specifically, the controller 70 includes one or more processors, memory, and the like.

The one or more processors may be realized by dedicated processors specialized for detection processing by the various detectors 61. The one or more processors may be realized by general-purpose processors such as Central Processing Units (CPUs).

The memory is realized, for example, by a random access memory (RAM) or a read-only memory (ROM). The memory stores, for example, a unique identification number set on the second circuit board 80, programs for controlling the operations of the temperature detector 81, pressure detector 82, and strain detector 62, a program for operating the communication interface 67, a program for executing processing when the communication interface 67 receives signals from outside, a program for controlling the first circuit board 60, and the like. The memory also stores the tire information detected by the temperature detector 81, pressure detector 82, and strain detector 62.

Furthermore, the circuit member 21 of this embodiment includes the communication interface 67. The communication interface 67 can transmit the tire information detected by the various detectors 61, or secondary information processed by the controller 70 based on this tire information, to an external device. More specifically, the communication interface 67 of this embodiment can transmit information input from the controller 70 to the external device such as an in-vehicle device. The various tire information or secondary information signals transmitted wirelessly from the communication interface 67 are received, for example, by radio circuitry of the in-vehicle device, and displayed on a display unit provided in a vehicle, as information regarding the condition of the tire 10, such as the temperature, pressure, presence or absence of an abnormality in the tire 10, and the like. The communication interface 67 of this embodiment can receive information from the outside and output the received information to the controller 70.

The communication interface 67 may be constituted of, for example, a transmission circuit, a transmission antenna, a reception circuit, and a reception antenna.

The temperature detector 81, the pressure detector 82, and a control circuit of the controller 70, and the transmission and reception circuits of the communication interface 67 described above may be integrated as a sensor unit in which functions are integrated into a single chip. In such a case, the sensor unit is mounted on the first circuit board 60 or the second circuit board 80. The transmission and reception antennas of the communication interface 67 may be provided as an antenna unit, separate from the sensor unit. In such a case, this antenna unit is mounted on the first circuit board 60 or the second circuit board 80.

As described above, the strain detector 62 of this embodiment is connected to the first circuit board 60 via the wiring 88. More specifically, as illustrated in FIG. 4, the strain detector 62 of this embodiment includes a sensing piece 62a and a detection body 62b. The sensing piece 62a is made of, for example, a thin metal plate with elasticity. The sensing piece 62a of this embodiment is disposed on the detector mounting surface 38a of the base member 38. Furthermore, the sensing piece 62a of this embodiment is extended into the through hole 35 from a portion disposed on the detector mounting surface 38a of the base member 38. This extended portion extends into the accommodation space S and is latched onto the housing 22. The strain detector 62 of this embodiment is thereby supported by the housing 22.

The detection body 62b is mounted on a surface of the sensing piece 62a on an opposite side of the base member 38 (a lower surface of the sensing piece 62a in FIG. 4). The detection body 62b detects a strain of the tire 10 that occurs when the tire 10 is stepped on or kicked out, through deformation of the sensing piece 62a as the tire 10 rotates. Since the detection body 62b is mounted on the surface of the sensing piece 62a on the opposite side of the base member 38 (the lower surface of the sensing piece 62a in FIG. 4), measurement accuracy of the detection body 62b is improved, compared to a configuration in which the detection body 62b is mounted on a surface of the sensing piece 62a on the side of the base member 38 (an upper surface of the sensing piece 62a in FIG. 4). However, the detection body 62b may be mounted on the surface of the sensing piece 62a on the side of the base member 38 (the upper surface of the sensing piece 62a in FIG. 4). This configuration improves the durability of the detection body 62b, compared to the configuration in which the detection body 62b is mounted on the surface of the sensing piece 62a on the opposite side of the base member 38 (the lower surface of the sensing piece 62a in FIG. 4).

As illustrated in FIG. 6, the detection body 62b includes, for example, a strain gage 63, a bridge circuit 64, a strain amplifier 65, and the like. The strain gage 63 constitutes a part of the bridge circuit 64. A voltage is applied to the bridge circuit 64, for example, from the strain amplifier 65, and a difference in a voltage value resulting from a change in resistance when the strain gage 63 detects a strain is output to the strain amplifier 65 as a signal.

The strain amplifier 65 includes a signal amplification circuit 65a, an A/D converter 65b, a power supply unit 65c, and the like. The signal amplification circuit 65a amplifies the signal input from the bridge circuit 64. The A/D converter 65b converts the signal amplified by the signal amplification circuit 65a into a digital signal and outputs the digital signal to the first circuit board 60. That is, the strain amplifier 65 outputs, to the first circuit board 60, a voltage value corresponding to the amount of the strain detected by the strain gage 63 as the digital signal.

The detection body 62b of the strain detector 62 may be, for example, a sensor chip that integrates the functions of the strain gage 63, bridge circuit 64, and strain amplifier 65 on a single chip as a rectangular so-called piezoresistive semiconductor. This sensor chip may be mounted, for example, with a measurement surface defined and this measurement surface facing a surface of the sensing piece 62a.

<Power Source 23 of Sensor Body 2>

The power source 23 of this embodiment is a battery. More specifically, the power source 23 of this embodiment is constituted of a disc-shaped button battery. However, the configuration of the power source 23 is not particularly limited. The electronic circuitry of the circuit member 21 operates by receiving power supply from the power source 23. More specifically, the power source 23 of this embodiment is connected to the first circuit board 60. The power source 23 of this embodiment feeds power directly to the first circuit board 60. The second circuit board 80 is indirectly powered by the power source 23 via the first circuit board 60. However, the battery as the power source 23 may be connected to the second circuit board 80.

<Cover Body 3>

As illustrated in FIG. 3, the cover body 3 covers at least a part of the periphery of the sensor body 2. Specifically, the cover body 3 of this embodiment covers almost the entire periphery of the sensor body 2. More specifically, the cover body 3 of this embodiment has connection holes to realize temperature detection by the temperature detector 81 and pressure detection by the pressure detector 82. The cover body 3 of this embodiment covers the entire periphery of the sensor body 2 at positions other than these connection holes.

The cover body 3 of this embodiment is composed of polyester resin, but the material of the cover body 3 is not particularly limited. The cover body 3 is preferably made of an elastomer, considering followability to deformation of the tire 10.

As described above, the cover body 3 includes the side surface 3b in which the concave portion 3b1 is formed at the predetermined position in the sensor height direction D. As illustrated in FIG. 3, the concave portion 3b1 of this embodiment is located between the mounting surface 3a and the second circuit board 80 in the sensor height direction D. Furthermore, the concave portion 3b1 of this embodiment is located between the mounting surface 3a and the first circuit board 60, which is disposed closest to the mounting surface 3a among the plurality (two in this embodiment) of circuit boards, in the sensor height direction D. The concave portion 3b1 is thereby easily disposed close to the mounting surface 3a in the sensor height direction D. Therefore, in the cover body 3, the thickness between the mounting surface 3a and the concave portion 3b1 in the sensor height direction D tends to be small. In other words, the concave portion 3b1 is easily disposed close to the tire inner surface. By disposing the concave portion 3b1 close to the tire inner surface, stress of the cover body 3 due to tire deformation is more easily absorbed by the concave portion 3b1.

As described above, the sensor body 2 of this embodiment includes the strain detector 62 as the detector 61. The strain detector 62 is preferably disposed close to the tire inner surface from the viewpoint of improving measurement accuracy. Therefore, in this embodiment, the position of a surface of the strain detector 62 on the side of the mounting surface 3a of the cover body 3 is disposed closer to the mounting surface 3a than the concave portion 3b1 of the cover body 3 in the sensor height direction D. However, from the viewpoint of improving durability, the position of the surface of the strain detector 62 on the side of the mounting surface 3a of the cover body 3 may be disposed farther from the mounting surface 3a than the concave portion 3b1 of the cover body 3 in the sensor height direction D.

Furthermore, the tubular portion 32 of the housing 22 of this embodiment is disposed farther from the mounting surface 3a than the concave portion 3b1 of the cover body 3 in the sensor height direction D. Thereby, the concave portion 3b1 is more easily deformed, compared to a configuration in which the tubular portion 32 of the housing 22 is disposed over both sides of the concave portion 3b1 in the sensor height direction D. That is, when the concave portion 3b1 deforms to absorb stress on the cover body 3, bending stress is less likely to occur in the tubular portion 32 of the housing 22. Therefore, the ability of the concave portion 3b1 to absorb stress on the cover body 3 can be increased. In addition, the configuration in which bending stress is less likely to occur in the tubular portion 32 owing to the deformation of the cover body 3 at the concave portion 3b1 makes it difficult to act an external force on the circuit member 21 in the tubular portion 32, thereby preventing damage or the like to the electronic components constituting the electronic circuitry.

Furthermore, as illustrated in FIG. 2, in the plan view of the tire sensor 1 along the sensor height direction D, the position of the concave portion 3b1 of this embodiment is outside an outer edge of the first circuit board 60. In the same plan view (see FIG. 2), the position of the concave portion 3b1 of this embodiment is outside an outer edge of the second circuit board 80. Here, the "position" in the "plan view of the tire sensor 1 along the sensor height direction D" means not only the position of a portion that can be seen in the above plan view, but also a position at which an invisible portion is projected on a paper surface. In FIG. 2, for convenience of explanation, a colored (grayscale) area indicates the position of the concave portion 3b1 to distinguish the position of the concave portion 3b1 from other portions. In FIG. 2, dashed lines indicate the position of the outer edge of the first circuit board 60 and the position of the outer edge of the second circuit board 80. Note that, the position of the outer edge of the first circuit board 60 and the position of the outer edge of the second circuit board 80 in this embodiment overlap in the plan view illustrated in FIG. 2, but are not limited to this configuration.

However, in the plan view of the tire sensor 1 along the sensor height direction D (see FIG. 2), the position of the concave portion 3b1 may be across the outside and inside of the outer edge of the first circuit board 60, or may be inside the outer edge of the first circuit board 60. In the same plan view (see FIG. 2), the position of the concave portion 3b1 may be across the outside and inside of the outer edge of the second circuit board 80, or may be inside the outer edge of the second circuit board 80.

As illustrated in FIG. 2, the tubular portion 32 of the housing 22 of this embodiment surrounds the first circuit board 60 in the plan view of the tire sensor 1 along the sensor height direction D. As illustrated in FIG. 2, the tubular portion 32 of the housing 22 of this embodiment surrounds the second circuit board 80 in the plan view of the tire sensor 1 along the sensor height direction D. In the same plan view (see FIG. 2), the position of the concave portion 3b1 in the side surface 3b of the cover body 3 is across the outside and inside of the tubular portion 32 of the housing 22. In FIG. 2, the outside of the tubular portion 32 means the outside of the outer circumferential surface 32b of the tubular portion 32. In FIG. 2, the inside of the tubular portion 32 means the inside of the inner circumferential surface 32a of the tubular portion 32.

As illustrated in FIG. 3, a maximum width W1 of the side surface 3b on the side of the mounting surface 3a with respect to the concave portion 3b1 in the sensor height direction Dis preferably 0.8 times to 1.2 times a maximum width W2 of the side surface 3b on the side of the first circuit board 60 and the second circuit board 80 with respect to the concave portion 3b1 in the sensor height direction D. The "maximum width of the side surface 3b" means a maximum length in the sensor width direction E.

Setting the maximum width W1 to be 0.8 times or more the maximum width W2 can prevent the center of gravity of the tire sensor 1 from being biased to an upside in the sensor height direction D, i.e., to an inside in the tire radial direction C when the tire sensor 1 is mounted on the tire inner circumferential surface 11a (see FIG. 1). That is, excessive vibration of the tire sensor 1 in the sensor width direction E can be prevented. This can further improve the durability of the tire sensor 1. In addition, setting the maximum width W1 to be 1.2 times or less the maximum width W2 can prevent an increase in the weight of the tire sensor 1 itself. Therefore, it is also possible to prevent an increase in the weight of the tire 10 due to installation of the tire sensor 1. From the viewpoint of both improving the durability of the tire sensor 1 and preventing an increase in the weight of the tire sensor 1, it is particularly preferable that the maximum widths W1 and W2 are approximately equal.

As illustrated in FIGS. 2 and 3, the concave portion 3b1 of this embodiment is an annular groove extending over the entire side surface 3b in the circumferential direction (in this embodiment, the same direction as the sensor circumferential direction F). By configuring the concave portion 3b1 as the annular groove, stress on the cover body 3 can be absorbed in any sensor width direction E orthogonal to the sensor height direction D when the tire sensor 1 is mounted on the tire inner surface.

The concave portion 3b1 in the side surface 3b is not limited to the annular groove of this embodiment. The concave portion 3b1 in the side surface 3b only needs to be formed at least a part of the side surface 3b in the circumferential direction (in this embodiment, the same direction as the sensor circumferential direction F). In such a case, the mounting surface 3a of the tire sensor 1 should be mounted on the tire inner circumferential surface 11a so that a position at which the concave portion 3b1 is formed in the sensor circumferential direction F is aligned with the tire circumferential direction B. However, from the viewpoint of eliminating anisotropy in the sensor circumferential direction F and increasing the ability of the concave portion 3b1 of the cover body 3 to absorb stress, it is preferable that the concave portion 3b1 in the side surface 3b be an annular groove, as in this embodiment.

As illustrated in FIG. 3, the cover body 3 of this embodiment is interposed not only in the periphery of the sensor body 2 but also between the circuit member 21, the housing 22, and the power source 23 of the sensor body 2. In other words, the sensor body 2 and the cover body 3 of this embodiment are integrally formed. The cover body 3 is molded, for example, so as to cover the outside of the entire housing 22 while being filled into the accommodation space S by molding.

The cover body 3 of this embodiment includes a pedestal portion 41 made of an elastomer. The pedestal portion 41 covers one side of the sensor body 2 in the sensor height direction D. Specifically, the pedestal portion 41 of this embodiment covers the strain detector 62 in the circuit member 21 and the outer bottom surface 31b of the housing 22 in which the strain detector 62 is disposed. The pedestal portion 41 of this embodiment includes a facing surface 41a that faces the sensor body 2, and the mounting surface 3a located on the opposite side of this facing surface 41a. A surface of the strain detector 62 of this embodiment that faces the tire inner surface (in this embodiment, a surface of the detection body 62b on the opposite side of the sensing piece 62a) is in contact with the facing surface 41a. That is, the pedestal portion 41 of the cover body 3 is a portion that is interposed between the sensor body 2 and the tire inner surface when the tire sensor 1 is mounted on the tire inner surface. The strain detector 62 of this embodiment can detect, as the tire information, strain information on the tire 10 through the pedestal portion 41 of the cover body 3. This can uniform the distance between the strain detector 62 and the tire inner surface, compared to a configuration in which the strain detector 62 is bonded to the tire inner surface with an adhesive without interposing the pedestal portion 41.

That is, it is possible to prevent the occurrence of individual differences in the accuracy of strain detection of the tire 10 by the tire sensor 1, due to a bonding process of the tire sensor 1 to the tire inner surface.

Note that, the mounting surface 3a may be mounted on the tire inner surface, for example, by being bonded to the tire inner surface with an adhesive. More specifically, in this embodiment, the adhesive is applied over the entire mounting surface 3a, and the entire mounting surface 3a is bonded to the tire inner surface. As the adhesive, for example, an instant adhesive or the like may be used. As the adhesive, one that forms a thin adhesive layer between the mounting surface 3a and the tire inner surface should be used.

The cover body 3 of this embodiment includes an annular cover portion 42 made of an elastomer, which covers the periphery of the sensor body 2 in the plan view along the sensor height direction D (see FIG. 2). The annular cover portion 42 of this embodiment is integrally connected from an outer edge of the pedestal portion 41. The side surface 3b of the cover body 3 of this embodiment is constituted of an outer surface 42a of the annular cover portion 42. That is, in this embodiment, the concave portion 3b1 is formed in the outer surface 42a of the annular cover portion 42. Thus, by forming the concave portion 3b1 in the annular cover portion 42 made of the elastomer, the concave portion 3b1 can be flexibly deformed, and the ability of the concave portion 3b1 to absorb stress on the cover body 3 can be further enhanced.

By filling the cover body 3 so as to be interposed not only in the periphery of the sensor body 2 but also between the circuit member 21, the housing 22, and the power source 23 in the sensor body 2, a manufacturing process of the tire sensor 1 can be simplified. The housing 22 of this embodiment includes the plurality of annular convex portions 33 in the outside of the tubular portion 32. Furthermore, the housing 22 of this embodiment includes the plurality of convex portions 36 on the outer bottom surface 31b of the bottom portion 31. The provision of the annular convex portions 33 and convex portions 36 prevent misalignment of the housing 22 with respect to the cover body 3. That is, even when an external force is applied to the tire sensor 1 as the tire 10 rotates, misalignment between the housing 22 and the cover body 3 can be prevented, and the housing 22 and the cover body 3 can be more easily maintained in an integrated state.

The cover body 3 only needs to cover at least a part of the sensor body 2 and include the mounting surface 3a and the side surface 3b described above. That is, the cover body 3 is not limited to such a configuration that covers the entire periphery of the sensor body 2 as in this embodiment. The cover body 3, for example, may not fill the accommodation space S of the housing 22. That is, the cover body 3 may not cover a part of the periphery of the sensor body 2. An example of such a cover body 3 is, for example, a configuration constituted of only the pedestal portion 41 and the annular cover portion 42 described above.

The tire sensor and the tire according to the present disclosure are not limited to the specific configurations described in the above embodiments, and various variations and modifications are possible without departing from the scope of the claims.

INDUSTRIAL APPLICABILITY

The present disclosure relates to a tire sensor and a tire.

REFERENCE SIGNS LIST

1 tire sensor
2 sensor body

3 cover body
3a mounting surface
3b side surface
3b1 concave portion
10 tire
10a inner space
11 tread
11a tire inner circumferential surface (tire inner surface)
15 rim
21 circuit member
22 housing
23 power source
31 bottom portion
31a inner bottom surface
31b outer bottom surface
32 tubular portion
32a inner circumferential surface
32b outer circumferential surface
33 annular convex portion
34 mounting portion
35 through hole
36 convex portion
37 support portion
38 base member
38a detector mounting surface
41 pedestal portion
41a facing surface
42 annular cover portion
42a outer surface
60 first circuit board
61 detector
62 strain detector
62a sensing piece
62b detection body
63 strain gage
64 bridge circuit
65 strain amplifier
65a signal amplification circuit
65b A/D converter
65c power supply unit
67 communication interface
70 controller
78 connection portion
80 second circuit board
81 temperature detector
82 pressure detector
88 wiring
200 road surface
A tire width direction
B tire circumferential direction
C tire radial direction
D sensor height direction
E sensor width direction
F sensor circumferential direction
S accommodation space
Hmax maximum sensor height
O central axis of tubular portion of housing
W1 maximum width of side surface on mounting surface side with respect to concave portion
W2 maximum width of side surface on circuit board side with respect to concave portion

The invention claimed is:

1. A tire sensor configured to be mountable on a tire inner surface, the tire sensor comprising:

a sensor body comprising electronic circuitry comprising
a detector configured to be able to detect tire information; and a cover body configured to cover at least a part of a periphery of the sensor body, wherein the cover body comprises:

a mounting surface configured to be mountable on the tire inner surface; and a side surface configured to rise from an outer edge of the mounting surface, in the side surface of the cover body, a concave portion is formed between the mounting surface and a height position of ¼ of a maximum sensor height in a sensor height direction orthogonal to the mounting surface, the sensor body comprises a circuit board, the concave portion in the side surface of the cover body is located between the mounting surface and the circuit board of the sensor body in the sensor height direction, and in a plan view along the sensor height direction, a position of the concave portion in the side surface of the cover body is outside an outer edge of the circuit board.

2. The tire sensor according to claim 1, wherein the sensor body comprises:

a circuit member configured to constitute the electronic circuitry; and a housing configured to support the circuit member, the circuit member comprises the circuit board, the housing comprises a tubular portion configured to surround a periphery of the circuit board in the plan view, and in the plan view, the position of the concave portion in the side surface of the cover body is across outside and inside of the tubular portion of the housing.

3. The tire sensor according to claim 1, wherein a maximum width of the side surface on a side of the mounting surface with respect to the concave portion in the sensor height direction is 0.8 times to 1.2 times a maximum width of the side surface on a side of the circuit board with respect to the concave portion in the sensor height direction.

4. The tire sensor according to claim 1, wherein the concave portion in the side surface of the cover body is an annular groove extending over the entire side surface in a circumferential direction.

5. The tire sensor according to claim 1, wherein the cover body comprises an annular cover portion made of an elastomer, the annular cover portion configured to cover the periphery of the sensor body in a plan view along the sensor height direction, and the side surface of the cover body is constituted of an outer surface of the annular cover portion.

6. The tire sensor according to claim 1, wherein the cover body comprises a pedestal portion made of an elastomer, the pedestal portion configured to cover one side of the sensor body in the sensor height direction, the pedestal portion comprises a facing surface configured to face the sensor body, and the mounting surface configured to be located on an opposite side of the facing surface, and the detector of the sensor body is a strain detector configured to detect, as the tire information, strain information on a tire through the pedestal portion of the cover body.

7. A tire comprising the tire sensor according to claim 1.

8. The tire sensor according to claim 2, wherein a maximum width of the side surface on a side of the mounting surface with respect to the concave portion in the sensor height direction is 0.8 times to 1.2 times a maximum width of the side surface on a side of the circuit board with respect to the concave portion in the sensor height direction.

9. The tire sensor according to claim 2, wherein the concave portion in the side surface of the cover body is an annular groove extending over the entire side surface in a circumferential direction.

* * * * *